(12) United States Patent
Pierotti et al.

(10) Patent No.: US 6,440,885 B1
(45) Date of Patent: Aug. 27, 2002

(54) ZEOLITE MEMBRANE AND A PROCESS FOR THE PRODUCTION THEREOF

(75) Inventors: Kim D. Pierotti, Horseheads; Dell J. St. Julien, Watkins Glen, both of NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/473,930

(22) Filed: Dec. 28, 1999

Related U.S. Application Data
(60) Provisional application No. 60/114,280, filed on Dec. 30, 1998.

(51) Int. Cl.[7] .............................. B01J 29/04; B01J 20/28; B01J 35/10
(52) U.S. Cl. ........................... 502/4; 502/64; 502/71; 502/77; 502/78; 502/79
(58) Field of Search ............................ 502/4, 60, 64, 502/71, 77, 78, 79

(56) References Cited

U.S. PATENT DOCUMENTS

| | | | |
|---|---|---|---|
| 3,523,092 A | | 8/1970 | Kearby |
| 3,730,910 A | | 5/1973 | Albers |
| 4,511,667 A | | 4/1985 | Mao et al. |
| 4,800,187 A | | 1/1989 | Lachman et al. |
| 5,248,643 A | | 9/1993 | Patil et al. |
| 5,258,339 A | * | 11/1993 | Ma et al. |
| 5,266,542 A | | 11/1993 | Hashimoto et al. |
| 5,362,522 A | | 11/1994 | Barri et al. |
| 5,413,975 A | | 5/1995 | Mueller et al. |
| 5,464,798 A | * | 11/1995 | Jia et al. |
| 5,567,664 A | | 10/1996 | Barri et al. |
| 5,605,631 A | | 2/1997 | Barri et al. |
| 5,716,527 A | * | 2/1998 | Deckman et al. |
| 5,763,347 A | * | 6/1998 | Lai |
| 5,824,617 A | | 10/1998 | Lai |
| 5,843,392 A | * | 12/1998 | Jansen et al. |
| 5,871,650 A | | 2/1999 | Lai et al. |
| 6,177,373 B1 | * | 1/2001 | Sterte et al. |

FOREIGN PATENT DOCUMENTS

| | | |
|---|---|---|
| WO | WO 93/08125 | 4/1993 |
| WO | WO 94/25151 | 11/1994 |
| WO | WO 94/25152 | 11/1994 |
| WO | WO 96/01686 | 1/1996 |
| WO | WO 96/01687 | 1/1996 |

* cited by examiner

*Primary Examiner*—Steven P. Griffin
*Assistant Examiner*—Christina Ildebrando
(74) *Attorney, Agent, or Firm*—Timothy M. Schaeberle; Kees van der Sterre (57) ABSTRACT

The present invention is directed at a supported zeolite structure comprising substantially-sintered monolithic porous ceramic substrate having coated thereon a uniformly thin, essentially continuous zeolite crystal layer covering at least one surface and associated pores of the porous ceramic material. The zeolite crystal layer is comprised of a single layer of zeolite crystals and is free of any growth enhancing, selectivity enhancing, or reparation layer and exhibits an oriented structure whereby the crystals exhibit a substantially columnar cross-section. Preferably, the porous ceramic substrate support comprises, on an analyzed oxide basis, 10–90%, by weight alumina and exhibits a crystal phase assemblage selected from the group consisting of cordierite, mullite, alumina, and/or mixtures thereof. A method for forming a zeolite membrane disclosed herein is also provided. The method generally comprises the steps of providing porous ceramic substrate and hydrothermally treating the substrate with an aqueous solution comprising sodium oxide or sodium hydroxide and having an alumina concentration of less than about 0.01%. The pH of the solution and the treatment time and temperature are such that these reaction conditions result in partial dissolution of the alumina in the substrate and essentially no nucleation in the solution thereby resulting in growth of the zeolite which is essentially continuous over the porous support.

16 Claims, 5 Drawing Sheets

FIG. 8

ZEOLITE MEMBRANE AND A PROCESS FOR THE PRODUCTION THEREOF

This application claims the benefit of U.S. Provisional Application No. 60/114,280, filed Dec. 30, 1998, entitled "Zeolite Membrane and a Process for the Production Thereof", by Pierotti et al.

BACKGROUND OF THE INVENTION

1. Field of the Invention

The present invention relates to a ceramic substrate-supported zeolite membrane and a method for forming the supported zeolite membrane and more particularly a monolithic ceramic substrate having supported thereon a thin dense, zeolite membrane exhibiting with few defects and a method for their production.

2. Discussion of the Related Art

Zeolites typically are hydrothermally formed alumina silicates of Group I and Group II elements. They can be represented by the following empirical formula: $M_{2/n}O.AL_2O_3.xSiO.2H_2O$, wherein "x" is generally equal to or greater than two and "M" is a cation having a valency of "n". Synthetic zeolites generally have a greater uniformity and purity than do natural zeolites, as well as a greater degree of reproducibility. As such synthetic zeolites are more reliably produced for industrial applications.

Synthetic zeolite membranes, including those grown on, or supported by ceramic supports have many uses. For example, they exhibit catalytic properties, which give them considerable industrial importance. Also, the crystallographic structure of synthetic zeolites makes them particularly suitable for use as molecular sieves and cation exchangers for separation.

Fabrication of practical zeolite membranes, including supported zeolite membranes, has long been a goal of separation and catalyst science. As such, there is considerable prior art which describes the preparation of supported zeolite catalysts; specifically many different types of zeolites have been deposited on many different types of supports. Generally, zeolite membranes are formed by sequentially immersing a porous support in solutions of different reactants and then exposing the support, having the reactant solutions disposed in the pores of the support, to conditions sufficient to cause a zeolite to form, thereby forming a zeolite membrane. However, sequentially immersing a porous support into various reactant solutions causes the distribution of reactions in the pores of the support to be irregular resulting in zeolite membranes having significantly limited quality. For example, U.S. Pat. No. 4,800,187 (Lachman) discloses a method of crystallizing strong-bound zeolites on the surfaces of a monolithic ceramic substrate by hydrothermally treating the substrate in the presence of active silica, with a caustic bath to zeolitize the silica. As disclosed therein, the active silica can be present as a component of the caustic bath, in the form of a dried coating pre-deposited on the substrate, or as separate phase of the monolithic substrate, homogeneously dispersed within the ceramic material.

For a zeolite membrane to be practical, it must have high flux as well as selectivity. Obtaining such a membrane has been difficult in the past because of defects in the zeolite film. Typically, membranes are grown using low alkaline synthesis routes as known in the art and involve the formation of several zones across the membrane thickness, involving the formation of larger crystals grown on top of smaller crystals. In several zones the crystals are not grown into a dense mat free of intercrystalline voids and therefore, in order to obtain a permselective zeolite membrane, the aforementioned zeolite layers comprised of these zones must be grown to an excessive thickness (>50 microns) to seal off voids and defects. This creates a great mass transfer resistance causing reduced flux. Obtaining functional zeolite membranes from high alkaline syntheses routes is difficult because the heterogeneous crystals in the membrane require an enormous membrane thickness to seal pinholes and void structures which lowers the membrane selectivity. The presence of such pinholes and voids is the cause of optical scattering in as synthesized high alkaline membranes.

One recent innovation as disclosed in WO 96/01686 details a composition useful for separations of molecules and catalytic conversions which comprises a substrate, a zeolite or zeolite-like material in contact with the substrate and a selectivity enhancing coating in contact with the zeolite. This selectivity enhancing coating provides two functions, both of which lead the enhanced selectivity of the zeolite composition: (1) a stabilization effect involving alleviating or dispersing mechanical stresses or deformations within the zeolite layer arising from harsh environments; and, (2) reparation effect involving the sealing of defects or voids in the zeolite layer.

U.S. Pat. No. 5,567,664 (Barri et al.) discloses membranes comprising crystalline zeo-type materials carried by a porous support, with the crystalline zeo-type material being essentially continuous over the pores of the support. The zeo-type crystalline material extends into, is crystallized directly from and bonds directly to this porous support. Although this reference discloses continuous zeolite-like membranes having a continuous layer of zeolite directly connected to the surface of a support, one difficulty arises in the complex method of forming this zeolite membrane. The complex method comprises immersing at least one surface of a porous support in a synthesis gel capable of crystallizing to produce a crystalline zeo-type material. The method thereafter involves inducing crystallization of the gel so that the zeo-type material crystallizes on the support. After removing the support from the mix, the method involves repeating these steps one or more, preferably 3–10, times to obtain a zeo-type material membrane which is crystallized directly from and bonds directly to the porous support.

With the use of zeolite membranes becoming more diverse and sophisticated, and in spite of the fact that there has been significant research in the field of zeolite membranes and, it still remains a need, and would be highly desirable and an advancement in the art, to have a simpler, more economical method of forming supported zeolite membranes, which are thin, and essentially continuous exhibiting very few defects.

SUMMARY OF THE INVENTION

It is an thus an object of the present invention to eliminate the above-mentioned problems, and to provide a thin, essentially continuous supported synthetic zeolite membrane and a simpler, yet effective process for forming the supported thin, essentially continuous zeolite membrane.

Specifically, one aspect of the invention is directed toward a supported zeolite structure comprising substantially-sintered monolithic porous ceramic substrate having coated thereon a uniformly thin, essentially continuous zeolite crystal layer covering at least one surface and associated pores of the porous ceramic material. The zeolite crystal layer is comprised of a single layer of zeolite crystals and is free of any growth enhancing, selectivity enhancing, or reparation layer and exhibits an oriented structure whereby the crystals exhibit a substantially columnar cross-section. Preferably, the porous ceramic substrate support comprises, on an analyzed oxide basis, 10–95%, by weight $Al_2O_3$, and exhibits a crystal phase assemblage selected from the group consisting of cordierite, mullite, crystobalite, alumina, and/or mixtures thereof.

The invention is further directed to a method for forming a zeolite membrane on the surfaces of a monolithic ceramic substrate, generally comprising the steps of providing porous ceramic substrate and hydrothermally treating the substrate with an aqueous solution comprising sodium oxide or sodium hydroxide and having an alumina concentration of less than about 0.01%. The pH of the solution and the treatment time and temperature are such that these reaction conditions result in partial dissolution of the alumina in the substrate and essentially no nucleation in the solution thereby resulting in growth of the zeolite which is essentially continuous over the porous support. The porous ceramic comprises between about 10–95% alumina, by weight, is partly reactive, thereby capable of providing the alumina raw material for forming the zeolite membrane. However, alkali content is relatively low so as to limit excess dissolution of alumina, therefore limiting the alumina content of the treatment solution.

BRIEF DESCRIPTION OF THE FIGURES

For a better understanding of the invention, reference is made to the attached drawings, wherein.

DETAILED DESCRIPTION OF THE INVENTION

The present invention provides a method for the zeolite crystalline layer, or membrane, on the surface of a monolithic ceramic substrate. In general, the method comprises utilizing a porous, partly reactive ceramic substrate having a composition comprising at least about between about 10–95%, by weight, alumina. The substrate configured as such, is capable of providing the alumina raw material for forming the zeolite membrane when subject to hydrothermal treatment. The method involves hydrothermally treating the substrate with an aqueous comprising either sodium oxide or sodium hydroxide and less than about 0.01% alumina. The resultant growth of the zeolite crystalline layer or membrane via this method is essentially continuous over the porous support.

The present invention further provides a supported membrane or crystalline zeolite layer which is itself is novel. Specifically, the supported synthetic zeolite membrane comprises a substantially-sintered monolithic substrate comprised of a porous ceramic material and a uniformly thin, essentially continuous zeolite crystal layer covering at least one surface and associated pores of the porous ceramic material.

The zeolite crystal layer of the present invention exhibits a number of distinct characteristics. Firstly, the zeolite crystal layer is directly attached to and integral with the surface of the porous support. As such, they are distinct from those prior art membranes that include an intermediate "glue" or binder (see, e.g., EP-A-180200), as well as those prior art membranes which include an intermediate layer of amorphous material between the porous support and the crystal layer. For instance, prior art membranes have been described as including, for example, growth enhancing, selectivity enhancing, or reparation layers.

Secondly, the crystalline layer is comprised of a single layer of zeolite crystals that exhibit an oriented structure with the crystals, preferably exhibiting a substantially columnar cross-section. As a result of this single-layer feature the zeolite crystalline or membrane layer is less than about 50 $\mu$m thick, and more preferably less than about 25 $\mu$m thick.

Another feature of this crystalline layer, is that in spite of the single layer characteristic of the crystalline layer, this membrane layer is essentially continuous over the portion of the support covered. The essentially continuous nature is due the morphology, shape and orientation of the zeolite crystals which enables the crystals to be densely packed together, with only the grain boundaries of the crystals separating them. This "essentially continuous" nature does not mean that the membrane is perfect and completely absent of voids, but it is intended to include membranes having a small number of voids or defects. However, the zeolite crystalline layer is sufficiently continuous so as not to require any post-treatment or reparation layer. Preferably, the crystalline zeolite membrane layer is defect-free and exhibits less than about 1%, by volume, of voids, a void being defined as space between adjacent zeolite crystals larger than 40 Å. In a preferred embodiment the zeolite crystal layer exhibits less than about 0.1%, by volume voids.

Referring again to the method of forming the supported zeolite crystalline membrane layer, the method generally involves hydrothermally treating the substrate with an low-alumina concentration solution containing the constituent silica and sodium oxides. It well known in the art that the precursor solution, particularly, the molar ratios of the constituent silica and sodium oxides, can be controlled and modified corresponding to the desired type of zeolite to be crystallized. The various types of zeolites contemplated for the instant invention include, but are not limited to the group consisting of zeolite X, zeolite Y, zeolite A, mordenite, MFI, including ZSM-5, sodalite, sodium-p1, zeolite beta, with the zeolite preferably comprising a ZSM-5 type. The particular composition of the precursor aqueous low-alumina concentration solution preferably comprises either sodium oxide or sodium hydroxide.

The sintered monolithic substrate suitable for use in the instant invention comprises a porous ceramic substrate comprising, on an analytical oxide basis, of between about 10–95% alumina, by weight. Furthermore, the substrate must be partly reactive, so upon subsequent hydrothermal treatment a portion of the alumina in substrate is leached from the substrate thereby providing the alumina raw material for forming the zeolite membrane. Put another way, the substrate should have an alumina rich phase inherent in structure that is capable of being dissolved from the structure upon contact with a subsequent hydrothermal treatment solution. It should be noted that alkali in the substrate can increase the rate of dissolution but excessive alkali, 1% by weight or more, can lead to poor surface nucleation and unwanted solution nucleation.

In a preferred embodiment, the substrate exhibits a major crystalline phase of either mullite or cordierite with the ceramic additionally having alumina in the crystalline phase assemblage. Preferably, the porous ceramic substrate support comprises, on an analyzed oxide basis, 10–95%, by weight $Al_2O_3$, 5–90% by weight $SiO_2$, 0–3% $M_2O$, 0–20% by weight MgO, where M is an alkali metal such as Li, Na, and K, and MgO can be substituted by BaO and/or CaO and where the porous support exhibits a crystal phase assemblage selected from the group consisting of cordierite, mullite, crystobalite, alumina, and/or mixtures thereof. More preferably, by weight, 30–95% $Al_2O_3$, 10–70% by weight $SiO_2$, 0–1% $M_2O$, and 0–15% MgO. Most preferably the porous substrate support exhibits a crystal phase assemblage consisting primarily of mullite and alumina and contains, by weight, 50–90% $Al_2O_3$, 10–50% by weight $SiO_2$, 0–0.5% $M_2O$, and 0–1% MgO.

The porous substrate, containing the alumina for forming the zeolite crystal layer can be prepared by conventional techniques. Specifically, certain inorganic raw materials, e.g., kaolin clay, silica and alumina, are admixed into a substantially homogeneous body and thereafter mixed with a temporary binder system, e.g., methylcellulose, sodium stearate and water. Normally, the dry ingredients are first premixed dry and thereafter mixed with any wet ingredients. Ultimately the batch mix is formed into the desired shape of the porous support, preferably by extrusion through a die. The shaped body is heated to temperature and for a time sufficient to sinter the ceramic material. Generally, the shaped body is dried at room temperature (RT) for a period sufficient to remove any water and thereafter fired at 1000 to 1600 C. for a period of between about 1–20 hours. The porous ceramic support for use in the invention can exhibit a variety of shapes, including, but not limited to flat sheets, tubes or spiral wound shapes. Preferably, the porous support comprises a multicellular structure such as a thin-walled honeycomb having at least 4, more preferably at least 100, and most preferably at least 200, through channels per square inch of frontal surface area and a wall thickness of about 3–100 mils.

The porosity of the ceramic substrate is an important parameter. In order for the alumina to be effectively leached from the substrate and ultimately reach the surface for ultimate formation of the zeolite crystal layer, the substrate must be porous; i.e., the substrate should exhibit a porosity of between about 20 to 60%, as measured by Hg porosimetry, preferably between about 30–40%, more preferably about 35%. Additionally, the substrate possesses pores having an average pore size of between 0.1 and 10 microns and more preferably between about 0.1 to 3 microns to ensure adequate permeance and at the same time limit gaps in the zeolite layer grown on the porous substrate surface.

A particularly preferred type of substrate is that disclosed in U.S. patent application Ser. No. 08/791,996 which discloses an extruded unibody structure or nested structure having both an interior and exterior section, a longitudinal axis and two sets of opened ended passages extending along the axis. The two sets of passages have different cross-sectional shapes or dimensions with respect to each other, with the nested structure including one set of the passages having a truncated arc shape.

Referring again to the hydrothermal treatment according to the present invention, specifically, the treatment involves maintaining the pH of the low-alumina concentration solution, containing the constituent silica and sodium oxides, as well as the treatment time and temperature, at levels so as to be effective to result in partial dissolution of the alumina in the porous substrate. Put differently, the alumina in the crystal structure of the substrate is caused to dissolve, leach out and reach the surface of the substrate. Furthermore, reaction conditions are maintained so that essentially no nucleation occurs in the solution, and to thereby produce the formation of a zeolite crystalline layer on the porous substrate. As such, the concentration of the alumina in the hydrothermal treatment solution maintained at lower value than the alumina concentration at or near the surface of the substrate. This enhances nucleation at or on the substrate surface and reduces, if not prevents, nucleation in solution. In other words, the reaction conditions are chosen so that the initial nucleation occurs primarily on, or near, the substrate surface while ensuring that few, if any, crystals grow large enough in the solution and thus settle on the substrate from Stokes settling. Ultimately these reaction conditions result in yielding a layer of nuclei being derived partially from reaction of the substrate.

It should be noted that the density of nuclei, and ultimately the density of the crystal formation, is controlled, in part by the reaction conditions, with lower NaOH concentrations giving small numbers of large nuclei. Furthermore, density of nuclei is influenced by the composition of the porous substrate in that the rate of nucleation is controlled by the amount of alumina that leaches from the substrate. For example, if too much alumina leaches from the substrate, solution nucleation will occur which results in the undesirable Stokes settling of zeolite crystals on the surface. As such, the NaOH concentration, as well as the composition of the substrate, specifically the amount of alumina in the substrate, must be empirically determined so that the resultant zeolite crystalline layer is dense enough to be continuous.

The conditions of the hydrothermal treatment according to the invention will vary, within the above conditions, according to the type of zeolite to be crystallized. Generally, crystallization of the ZSM-5 type zeolite on the porous ceramic surface requires that the ceramic be in contact with the precursor treatment solution having a pH of between 9 and about 13.5, for a time of between about one hour to 12 days at a temperature between about 60 to 200° C.

In a preferred embodiment for crystallizing the ZSM-5 zeolite on the surface of the porous ceramic substrate, the hydrothermal treatment involves a two step treatment. The first treatment step involves maintaining the porous ceramic substrate in contact with a first sodium hydroxide solution having a pH of between 10 and 11.5 at a temperature of 100° C. for a period of about 2 days, most preferably having a pH of between 10.2 and 11. The second treatment step involves contacting the intermediate porous ceramic substrate with a second sodium hydroxide solution having a pH of around 12 at a temperature of 160° C. for a period of about 1 day.

The compositions are useful for separation processes whereby feedstock derived from petroleum, natural gas, hydrocarbons, or air comprising at least two molecular species is contacted with the composition of the invention, wherein at least one molecular species of said feedstock is separated by said composition and wherein said hydrocarbon feedstocks are coal, bitumen and kerogen derived feedstocks. Separations which may be carried out using a composition in accordance with the invention include, for example, separation of normal alkanes from co-boiling hydrocarbons, especially n-$C_{10}$ to $C_{16}$ alkanes from kerosene, normal alkanes and alkenes from the corresponding branched alkane and alkene isomers; separation of aromatic compounds from one another, especially separation of $C_8$ aromatic isomers from each other, more especially paraxylene from a mixture of xylenes and, optionally, ethylbenzene, and separation of aromatics of different carbon numbers, for example, mixtures of benzene, toluene, and mixed $C_8$ aromatic molecules with from 6 to 8 carbon atoms from $C_5$ to $C_{10}$ (naphtha range) aliphatics; separation of olefinic compounds from saturated compounds, especially light alkenes from alkane/alkene mixtures, more especially ethene from ethane and propene from propane; removing hydrogen from hydrogen-containing streams, especially from light refinery and petrochemical gas streams, more especially from $C_2$ and lighter components; and alcohols from aqueous streams. Also alcohols from other hydrocarbons, particularly alkanes and alkenes that may be present in mixtures formed during the manufacture of alcohols.

Specifically, the following table shows some possible feedstocks derived from petroleum, natural gas, hydrocarbons, or air and the molecular species separated therefrom by use of the instant compositions. The table is not meant to be limiting.

| Feedstock | Separated Molecular Species |
|---|---|
| Mixed xylenes (ortho, para, meta) and ethylbenzene | Paraxylene |
| Mixture of hydrogen, $H_2S$, and ammonia | Hydrogen |
| Mixture of normal and isobutanes | Normal butane |
| Mixture of normal and isobutanes | Normal butene |
| Kerosene containing $C_9$ to $C_{18}$ normal paraffins | $C_9$ to $C_{18}$ normal paraffins |
| Mixture of nitrogen and oxygen | Nitrogen (or oxygen) |
| Mixture of hydrogen and methane | Hydrogen |
| Mixture of hydrogen, ethane, and ethylene | Hydrogen and/or ethylene |
| H2, propane and propylene | Hydrogen and/or propylene |
| Coker naphtha containing $C_5$ to $C_{10}$ normal olefins and paraffins | $C_5$ to $C_{10}$ normal olefins and paraffins |
| Methane and ethane mixtures containing argon, helium, neon, or nitrogen | Helium, neon, and/or argon |
| Intermediate reactor catalytic reformer products containing hydrogen and/or light gases | Hydrogen, and/or light gases ($C_1$–$C_7$) |
| Fluid catalytic cracking products containing $H_2$ and/or light gases | Hydrogen, and/or light gases |
| Naphtha containing $C_5$ to $C_{10}$ normal paraffins | $C_5$ to $C_{10}$ normal paraffins |
| Light coker gas oil containing $C_9$ to $C_{18}$ normal olefins and paraffins | $C_9$ to $C_{18}$ normal olefins and paraffins |
| Mixture of normal and isopentanes | Normal pentane |
| Mixture of normal and isopentenes | Normal pentane |
| Mixture of ammonia, hydrogen, and nitrogen | Hydrogen and nitrogen |
| Mixture of A10 (10 carbon) aromatics | e.g. Paradiethylbenzene (PDEB) |
| Mixed butenes | n-Butenes |
| Sulfur and/or nitrogen compounds | H2S and/or NH3 |
| Mixtures containing Benzene (Toluene) | Benzene |

Applicants believe that molecular diffusion is responsible for the above separations. Additionally, the compositions can be used to effect a chemical reaction to yield at least one reaction product by contacting the feedstocks as described above or below with the compositions having a catalyst incorporated within the zeolite layer, support, or intermediate layer or by placing the catalyst in close enough proximity with the composition to form a module. A module would react the feedstock just prior to its entrance into the composition or just after its exit from the composition. In this manner one can separate at least one reaction product or reactant from the feedstocks. The catalysts of choice for particular process fluids are well known to those skilled in the art and are readily incorporated into the instant compositions or formed into modules by one skilled in the art. The following table represents some of the possible feedstocks/processes, in addition to those above which can be reacted and some possible products yielded. The table is not meant to be limiting.

| Feedstock/process | Product Yielded |
|---|---|
| Mixed xylenes (pars, ortho, meta) and ethylbenzene | Paraxylene and/or ethylbenzene |
| Ethane dehydrogenation to ethylene | Hydrogen and/or Ethylene |
| Ethylbenzene dehydrogenation to styrene | Hydrogen |
| Butanes dehydrogenation butenes (iso's and normals) | Hydrogen |
| Propane dehydrogenation to propylene | Hydrogen and/or Propylene |
| $C_{10}$–$C_{18}$ normal paraffin dehydrogenation to olefins | Hydrogen |
| Hydrogen Sulfide decomposition | Hydrogen |
| Reforming dehydrogenation/aromatization | Hydrogen, light hydrocarbons ($C_1$–$C_7$) |
| Light Petroleum Gas dehydrogenation/aromatization | Hydrogen |
| Mixed Butenes | n-butenes |
| Hydrocarbon streams containing sulfur and/or nitrogen compounds (hydrotreating/hydroprocessing) | $N_2S$ and or $NH_3$ with or without $H_2$ |

The zeolite layer of the invention may be employed as a membrane in such separations without the problem of being damaged by contact with the materials to be separated. Furthermore, many of these separations are carried out at elevated temperatures, as high at 500° C., and it is an advantage of the supported zeolite layer of the present invention that it may be used at such elevated temperatures.

The present invention accordingly also provides a process for the separation of a fluid mixture which comprises contacting the mixture with one face of a zeolite layer according to the invention under conditions such that at least one component of the mixture has a different steady state permeability through the layer from that of another component and recovering a component or mixture of components from the other face of the layer.

The invention further provides a process for catalyzing a chemical reaction which comprises contacting a feedstock with a zeolite layer according to the invention which is in active catalytic form under catalytic conversion conditions and recovering a composition comprising at least one conversion product.

The invention further provides a process for catalyzing a chemical reaction which comprises contacting a feedstock with one face of a zeolite layer according to the invention, that is in active catalytic form, under catalytic conversion conditions, and recovering from an opposite face of the layer at least one conversion product, advantageously in a concentration differing from its equilibrium concentration in the reaction mixture. For example, p-xylem rich mixture from the reactor or reactor product in a xylenes isomerization process; aromatic compounds from aliphatics and hydrogen in a reforming reactor; hydrogen removal from refinery and chemicals processes such as alkane dehydrogenation in the formation of alkenes, light alkane/alkene dehydrocyclization in the formation of alkenes, light alkane/alkene dehydrocyclization in the formation of aromatics (e.g., Cyclar), ethylbenzene dehydrogenation to styrene.

The invention further provides a process for catalyzing a chemical reaction which comprises contacting one reactant of a bimolecular reaction with one face of a zeolite layer according to the invention, that is in active catalytic form, under catalytic conversion conditions, and controlling the addition of a second reactant by diffusion from the opposite face of the layer in order to more precisely control reaction conditions. Examples include: controlling ethylene, propylene or hydrogen addition to benzene in the formation of ethyl benzene, cumene or cyclohexane respectively.

The invention further contemplates separation of a feedstock as described herein wherein the separated species reacts as it leaves the composition or as it passes through the composition and thus forms another product. This is believed to increase the driving force for diffusion through the membrane layer.

Some specific reaction systems where these compositions would be advantageous for selective separation either in the reactor or on reactor effluent include: selective removal of a Para-Xylene rich mixture from the reactor, reactor product, reactor feed or other locations in a Xylenes isomerization process; selective separation of aromatics fractions or specific aromatics molecule rich streams from catalytic reforming or other aromatics generation processes such as light alkane and alkene dehydrocyclization (e.g., C3–C7 paraffins to aromatics from processes such as Cylcar), methanol to gasoline and catalytic cracking processes; selective separation of benzene rich fractions from refinery and chemical plant streams and processes; selective separation of olefins or specific olefin fractions from refinery and chemicals processing units including catalytic and thermal cracking, olefins isomerization processes, methanoloto olefins processes, naphtha to olefins conversion processes, alkane dehydrogenation processes such as propane dehydrogenation to propylene; selective removal of hydrogen from refinery and chemicals streams and processes such as catalytic reforming, alkane dehydrogenation, catalytic cracking, thermal cracking, light alkane/alkene dehydrocyclization, ethylbenzene dehydrogenation, paraffin dehydrogenation; selective separation of molecule isomers in processes such as butane isomerization, paraffin isomerization, olefin isomerization, selective separation of alcohols from aqueous streams and/or other hydrocarbons.

EXAMPLES

To further illustrate the principles of the invention of the present invention, there will be described several examples of the supported zeolite membranes formed according to the invention, as well as certain examples for comparison. However, it is to be understood that the examples are given for illustrative purpose only, and the invention is not limited thereto, but various modifications and changes may be made in the invention, without departing from the spirit of the invention.

Example 1

A porous alumina/silica ceramic substrate having a major crystalline phase of mullite was prepared in the following manner. An inorganic powder batch mixture suitable for the formation of this substrate was prepared by combining and dry mixing together the components of the designated inorganic mixture as listed in Table I; in percent by weight. An amount of the organic binder system listed in Table I was then added to the inorganic dry mixture and thereafter further mixed to form a plasticized ceramic batch mixture; the binder system components, as detailed in Table I are based on 100 parts total inorganics.

This plasticized mixture was extruded through an extruder under conditions suitable to form green ceramic ribbon from which a ¾" diameter disk was cut. The green ceramic disk was dried for approximately 10 minutes, and thereafter subjected to a heating and firing cycle sufficient to remove the organic binder system from, and to sinter, the honeycomb disk. Specifically, the green disk was fired to between 1400 and 1450° C. and held for a period of about 10 hours. The resultant porous ceramic exhibited an analytical oxide composition, weight percent on the oxide basis of 27.4% (39%—mole) $SiO_2$ and 71.2% (59.7%—mole) $Al_2O_3$, 1% TiO2 (1.1%—mole), the remainder primarily $Fe_2O_3$, $Na_2O$, CaO, and $B_2O_3$ (less than 0.2 wt % each), and possessed an overall porosity, as determined by Hg porosity, of 44% and a mean pore diameter of around 0.43 microns.

TABLE I

| | WEIGHT % |
|---|---|
| INORGANICS | |
| Ball Clay | 8.0 |
| Calcined clay | 44.7 |
| Alumina | 47.3 |
| BINDER SYSTEM (ADDITON TO 100% INORGANICS) | |
| Methocel | 6.0 |
| Sodium Stearate | 0.5 |
| Water | 31 |

The porous mullite disk was placed in 125-ml vessel and subsequently hydrothermally treated with a NaOH-containing solution. Specifically, the hydrothermal treatment involved placing the mullite disk support in a PTFE lined stainless steel digestion bomb and filling the bomb with a NaOH-containing solution having a pH of around 10.7. The NaOH-containing solution having the pH of 10.7 was formed from a base solution comprising 0.04 g NaOH, 52.5 g $H_2O$, 5.9 g tetra-propylammonium bromide and 10.0 g $SiO_2$ (Ludox HS40). The hydrothermal treatment next involved placing the digestion bomb, at autogenous pressure, containing the solution and support into a furnace and heating the support/solution at 60° C. for a period of 12 days. After hydrothermal treatment, the porous ceramic supported zeolite was washed with hot distilled water, dried in air, and characterized by X-ray diffraction (XRD). Table II reports the major zeolite crystalline peaks, specifically ZSM-5 peaks, that were clearly distinguishable from the mullite peaks of the substrate, the percentage being relative to the strongest peak (a mullite peak at around d=3.4) in the X-ray pattern generated by the mullite ceramic supported zeolite. The crystals in Example 1 take on a plate-like habit.

TABLE II

| d-spacing | Relative Intensity |
|---|---|
| 11.25 | 3% |
| 10.08 | 5% |
| 3.84 | 17% |

Example 2

A porous mullite support disc like that used for Example 1 was used for the support of Example 2. The hydrothermal treatment again involved placing the bomb containing the solution and support into a furnace and heating the support/solution at 60° C. for a period of 12 days.. However, in Example 2 the NaOH (same base solution) was modified to have a pH of 13.4. As before, after hydrothermal treatment, the porous ceramic supported zeolite was washed with hot distilled water, in air, and characterized by X-ray diffraction (XRD). Table III reports the major zeolite crystalline peaks, again ZSM-5 peaks, that were clearly distinguishable from the mullite peaks. The crystals in Example 2 appear take on a spherical habit.

TABLE III

| d-spacing | Relative Intensity |
|---|---|
| 11.09 | 1% |
| 9.85 | 1% |
| 3.831 | 5% |

Example 3

A porous alumina/silica ceramic substrate disk having a major crystalline phase of mullite was prepared in the same manner as for that substrate in Examples 1, except that the inorganic powder batch mixture suitable for the formation of this substrate was that listed in TABLE IV. The resultant porous ceramic exhibited an analytical oxide composition, weight percent on the oxide basis of 24.6% (35.6%—mole) $SiO_2$ and 74.2% (63.2%—mole) $Al_2O_3$, 0.83% TiO2 (0.92%—mole), the remainder primarily $Fe_2O_3$, $Na_2O$, CaO, and $B_2O_3$ (less than 0.2 wt % each), and possessed an overall porosity, as determined by Hg porosity, of 40.4% and a mean pore diameter of around 0.36 microns. The porous support was hydrothermally in the same manner as Example 1; use of an NaOH solution having a pH of 10.7 and heating of the support/solution at 60° C. for a period of 12 days.

The porous ceramic supported zeolite was washed with hot distilled water, dried in air, and again was characterized by X-ray diffraction (XRD). Table V reports the major zeolite crystalline peaks, again ZSM-5 peaks, that were clearly distinguishable from the mullite peaks.

TABLE IV

| | WEIGHT % |
|---|---|
| INORGANICS | |
| Ball Clay | 16 |
| Calcined clay | 32 |
| Alumina | 52 |
| BINDER SYSTEM (ADDITON TO 100% INORGANICS) | 4 |
| Methocel | |
| Sodium Stearate | 0.5 |
| Water | 28.7 |

TABLE V

| d-spacing | Relative Intensity |
|---|---|
| 11.19 | 3% |
| 10.0 | 5% |
| 3.853 | 10% |
| 3.825 | 15% |

Example 4

Figure 1:
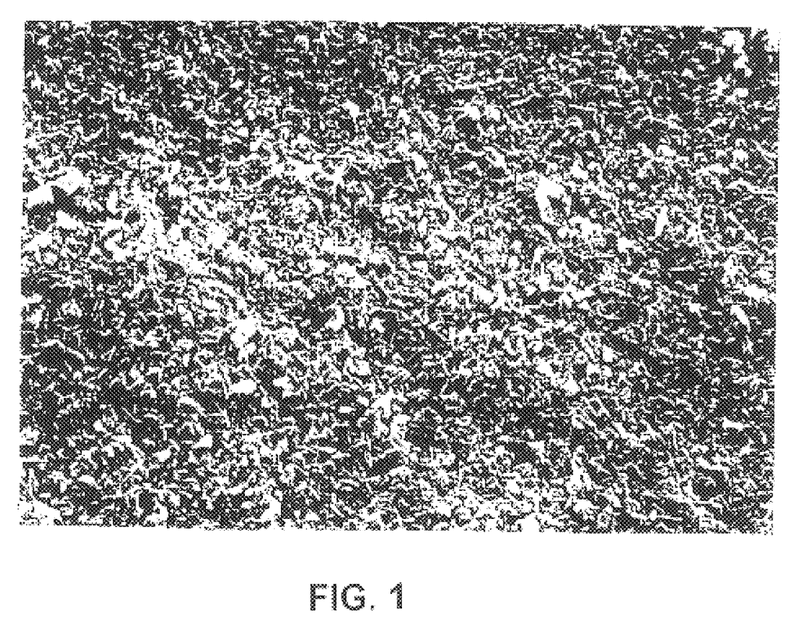
FIG. 1 is a scanning electron micrograph (SEM) at a magnification of 2000× of the surface of a mullite substrate prior to hydrothermal treatment.

A porous alumina/silica ceramic substrate disk having a major crystalline phase of mullite was prepared in the same manner as for that substrate in Example 1. FIG. 1 is a scanning electron micrograph (SEM) taken at a magnification of 2000x of the surface of the mullite substrate prior to hydrothermal treatment. The porous mullite support was hydrothermally treated in a like manner as Example 1 above, except that the treatment time and temperature were 100° C. and 72 hours, respectively. The porous ceramic supported zeolite was washed and characterized by X-ray diffraction (XRD), as before. Table VI reports the major zeolite crystalline peaks, specifically ZSM-5 peaks, that were clearly distinguishable from the mullite peaks of the substrate, the percentage being relative to the strongest peak in the X-ray pattern generated by the mullite ceramic supported zeolite.

TABLE VI

| d-spacing | Relative Intensity |
|---|---|
| 11.19 | 3% |
| 10.05 | 5% |
| 3.851 | 10% |
| 3.827 | 15% |

Figure 2:
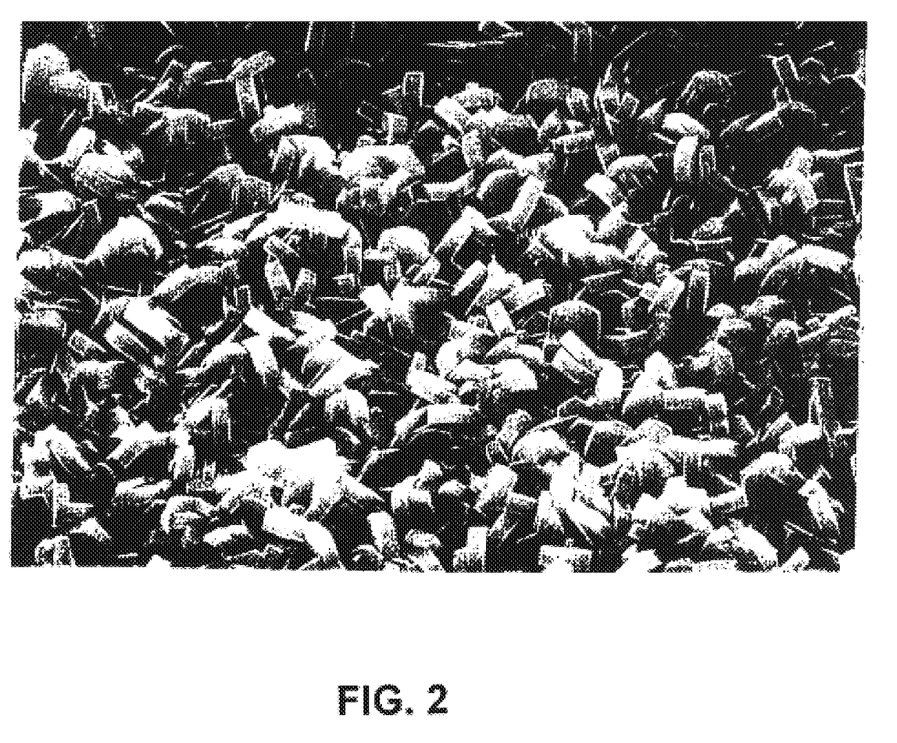
FIG. 2 is a SEM at a magnification of 5000× of the supported zeolite membrane structure of Example 4, according to the invention.

FIG. 2 is a scanning electron micrograph (SEM) taken at a magnification of 2000x of the supported ZSM-5 zeolite membrane. An examination of the SEM shows that the zeolite membrane completely and densely covers the mullite porous support; i.e., a continuous zeolite membrane.

Figure 3:
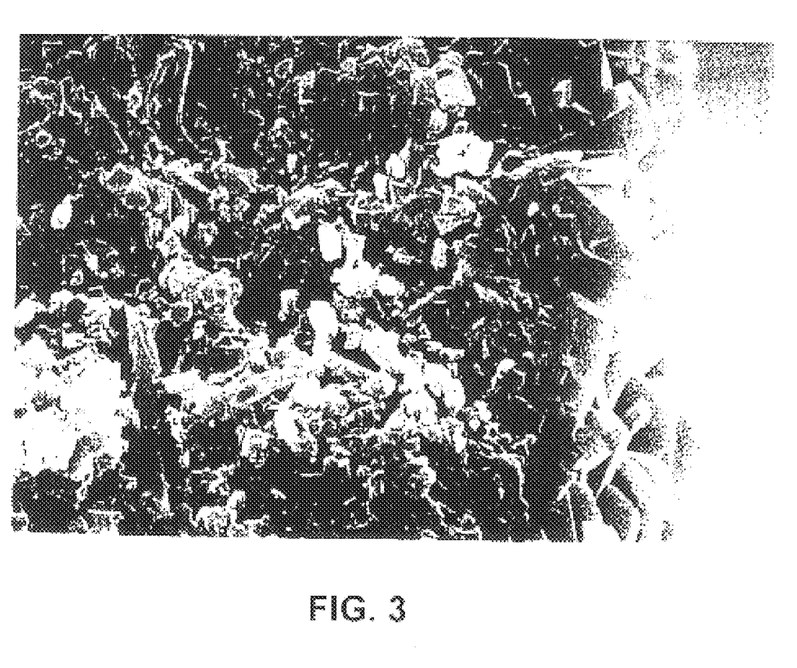
FIG. 3 is a SEM at a magnification of 5000× of a cross-section of the supported zeolite membrane of FIG. 1.

FIG. 3 is a SEM taken at a magnification of 5000x of a cross-section of the supported ZSM-5 zeolite membrane. An examination of the SEM reveals the following: (1) the zeolite membrane is continuous and comprises a single layer of zeolite crystals; (2) the zeolite crystal membrane is grown directly from the surface: and (3) the support/membrane structure does not exhibit any growth enhancing, selectivity enhancing, or reparation layers.

Example 5

A porous alumina/silica ceramic substrate having a major crystalline phase of mullite was prepared in the same manner as for that substrate in Example 2. The porous mullite support was hydrothermally treated like that for Example 4, treatment time and temperature of 100° C. and 72 hours, except that the pH of the NaOH treatment solution was 13.4. The porous ceramic supported zeolite was washed and characterized by X-ray diffraction (XRD), as before. Table VII reports the major clearly distinguishable ZSM-5 zeolite crystalline peaks, again, the percentage being relative to the strongest peak in the X-ray pattern generated by the mullite ceramic supported zeolite.

TABLE VII

| d-spacing | Relative Intensity |
|---|---|
| 11.05 | 1% |
| 3.949 | 8% |
| 3.826 | 7% |

Example 6

A porous alumina/silica ceramic disk substrate having a major crystalline phase of mullite was prepared in the same manner as for that disk substrate in Example 2. The porous mullite support was hydrothermally treated in a like manner as for the substrate/supports above utilizing a NaOH solution having a pH of 13.4 however the treatment time and temperature were 140° C. and 18 hours, respectively. The porous ceramic supported zeolite was washed and characterized by X-ray diffraction (XRD), as before. Table VIII reports the major clearly distinguishable ZSM-5 zeolite crystalline peaks, again, the percentage being relative to the strongest peak in the X-ray pattern generated by the mullite ceramic supported zeolite.

TABLE VIII

| d-spacing | Relative Intensity |
|---|---|
| 11.27 | 5% |
| 10.15 | 4% |
| 3.866 | 12% |

Example 7

A porous mullite support disk like that of Example 1 was used for the support of Example 7. The hydrothermal treatment utilized in the formation of the Example 7 support/membrane structure involved a two-step treatment process. Specifically, the first step involved placing the support in the PTFE lined stainless steel bomb and filling the vessel with a NaOH solution having a pH of 10.7 and thereafter heating the immersed support for 48 hours at a temperature of 100° C. After removal from the first treatment solution, the support/membrane structure was placed in a second PTFE lined stainless bomb and filling the vessel with a second solution, like that of Example 1 but containing 0.2 g NaOH and having a pH of around 12, and heating the immersed support at 160° C. for a period of 24 hours. Upon removal from the second treatment the support/membrane structure was dried in air. Essentially the formation of Example 7 involved a separate nucleation and a fast crystal growth step.

Figure 4:
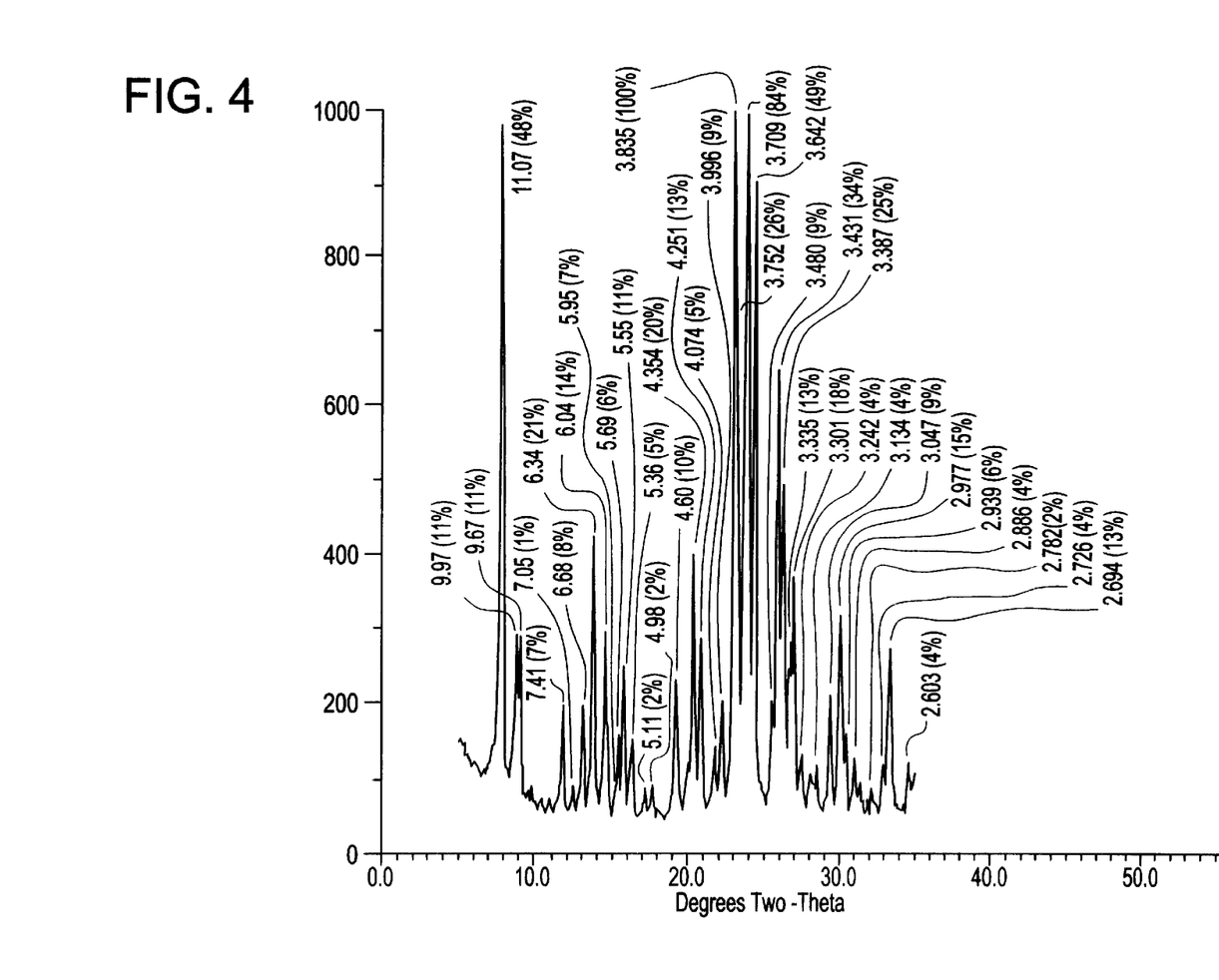
FIG. 4 is a graphical illustration of the X-ray diffraction pattern of the support/zeolite structure of Example 7.

The porous ceramic supported zeolite was washed and characterized by X-ray diffraction (XRD), as before: FIG. 4 illustrates the resultant XRD pattern of the Example 7 support/membrane structure.

Figure 5:
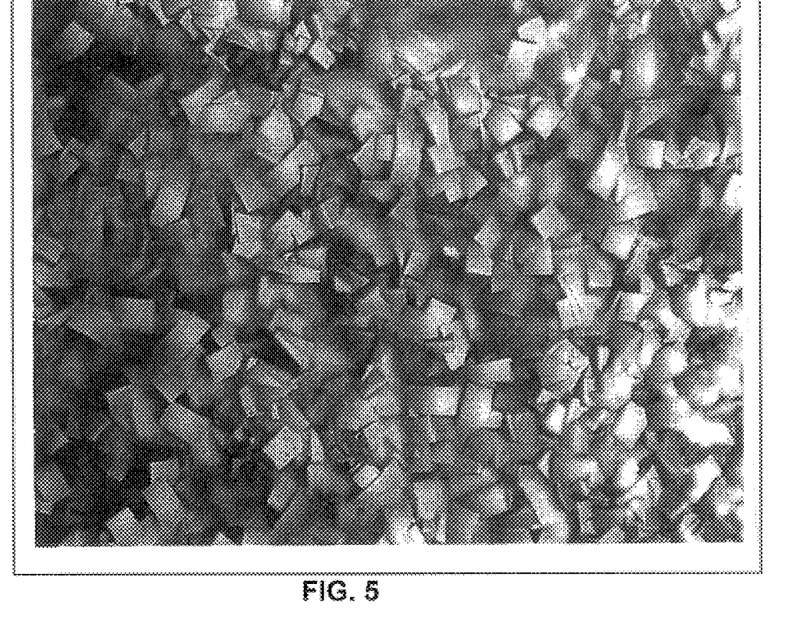
FIG. 5 is an optical micrograph at a magnification of 5000× of the supported zeolite membrane of Example 7.

FIG. 5 is an optical micrograph taken at a magnification of 500× of the supported ZSM-5 zeolite membrane of Example 7. An examination of the SEM shows that the zeolite crystals of the membrane are densely packed and cover the entire mullite porous support; i.e., a continuous zeolite membrane.

Figure 6:
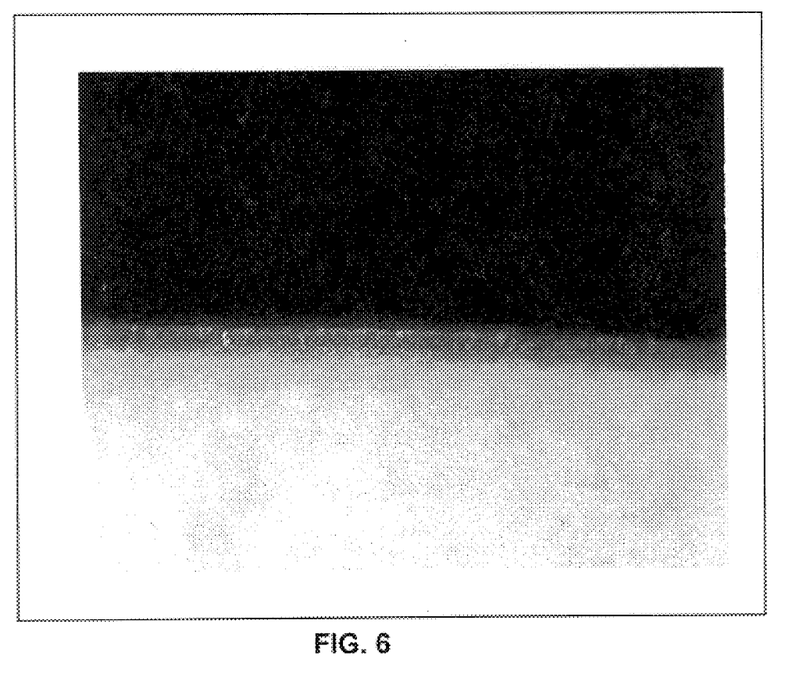
FIG. 6 is an optical micrograph at a magnification of 2000× of a cross-section of the supported zeolite membrane of FIG. 5.

FIG. 6 is an optical micrograph taken at a magnification of 200× of a cross-section of the supported ZSM-5 zeolite membrane of Example 7. An examination of the SEM reveals that the crystal membrane is comprised of single layer of zeolite crystals exhibiting a thickness of about 18 $\mu$m and that the support/membrane structure is absent any exhibit any growth enhancing, selectivity enhancing, or reparation layers.

TABLE VIII

| d-spacing | Relative Intensity |
|---|---|
| 11.1 | 41% |
| 9.97 | 2% |
| 3.847 | 14% |

Example 8

A series of porous alumina/silica ceramic substrates having major crystalline phases of mullite and alpha-alumina were prepared in the same manner as for that substrate in Example 1 with inorganic batch materials and oxide compositions as listed in Table IX. The substrates consisted of primarily mullite and alumina as indicated by X-ray diffraction. The relative intensities of two clearly distinguishable diffraction peaks are given in Table X for Samples A through D, the peak at around 3.394 being the most intense mullite peak and the peak at 2.090 being the most intense, and clearly distinguishable, alumina peak. The concentration of mullite is seen to drop as the alumina content increases until only a small percentage is present in sample D. The porous supports were hydrothermally treated like that for Example 4, except that the treatment time was 48 hours. The pH of the NaOH treatment solutions were about 10.7. The porous ceramic supported zeolites were washed and characterized by X-ray diffraction, as before. Table XI reports the major clearly distinguishable ZSM-5 zeolite crystalline peaks, again, the percentage being relative to the strongest peak in the X-ray pattern generated by the mullite ceramic supported zeolite. The data in Table XI show the effect of increasing the alumina content and thus reducing the soluble fraction available for dissolution and subsequent zeolite growth. For Sample D, the alumina content is close to 95% and the amount of zeolite grown, as indicated by X-ray intensity, is a factor of 3 to 7 less than for the compositions A and B with around 80% alumina. These results indicate that the alumina phase is not sufficiently soluble to provide the desired nucleation of zeolite.

TABLE IX

| SAMPLE | A | B | C | D |
|---|---|---|---|---|
| INORGANICS WEIGHT % | | | | |
| Ball Clay | 8 | 8 | 8 | 8 |
| Calcined clay | 32 | 22 | 12 | 6 |
| Alumina | 60 | 70 | 80 | 90 |
| OXIDE WEIGHT % | | | | |
| $Al_2O_3$ | 78.3 | 83.8 | 89.3 | 94.9 |
| $SiO_2$ | 20.7 | 15.4 | 10.1 | 4.7 |
| $Na_2O$ | 0.2 | 0.22 | 0.23 | 0.25 |
| $TiO_2$ | 0.83 | 0.62 | 0.40 | 0.17 |

TABLE X

| SAMPLE | A | B | C | D |
|---|---|---|---|---|
| RELATIVE INTENSITY % FOR SUBSTRATE | | | | |
| d-spacing of ~3.395 | 100 | 61 | 30 | 9 |
| d-spacing of ~2.090 | 53 | 86 | 91 | 100 |

TABLE XI

| SAMPLE | A | B | C | D |
|---|---|---|---|---|
| RELATIVE INTENSITY % FOR ZEOLITE | | | | |
| d-spacing of ~11 | 22 | 25 | 10 | 7 |
| d-spacing of ~5.4 | 35 | 30 | 12 | 5 |

Comparison Example 1

A porous alumina/silica ceramic disk substrate having a major crystalline phase of mullite was prepared in the same manner as for that disk substrate in Example 3. The porous mullite support was hydrothermally treated in a like manner as for the substrate/supports above utilizing a NaOH solution having a pH of 12.7; treatment condition outside the scope of the invention. The treatment time and temperature utilized were like that for Example 6; 140° C. and 18 hours, respectively. The porous ceramic supported zeolite was washed and characterized by X-ray diffraction (XRD), as before. Table XII reports the major clearly distinguishable ZSM-5 zeolite crystalline peaks, again, the percentage being relative to the strongest peak in the X-ray pattern. This x-ray pattern, along with observations from optical microscopy, reveals a thick and non-uniform zeolite membrane layer as result of treatment conditions that resulted in the dissolution of alumina from the substrate with resulting formation in the solution of zeolite crystals that settle onto the surface of the mullite substrate as a result of Stokes settling.

TABLE XII

| d-spacing | Relative Intensity |
|---|---|
| 11.13 | 23% |
| 10.0 | 14% |
| 3.842 | 66% |
| 3.397 | 11% |

Comparison Example 2

An amorphous porous silica ceramic substrate was prepared in the similar manner to the mullite supports above. The resultant sintered ceramic porous exhibited an analytical oxide composition, weight percent on the oxide basis of 100% $SiO_2$ and possessed an overall porosity, as determined by Hg porosity, of around 30%.

The porous silica support was hydrothermally treated in a like manner as Example 1 above, except that the treatment time and temperature were 100° C. and 48 hours, respectively.

Figure 7:
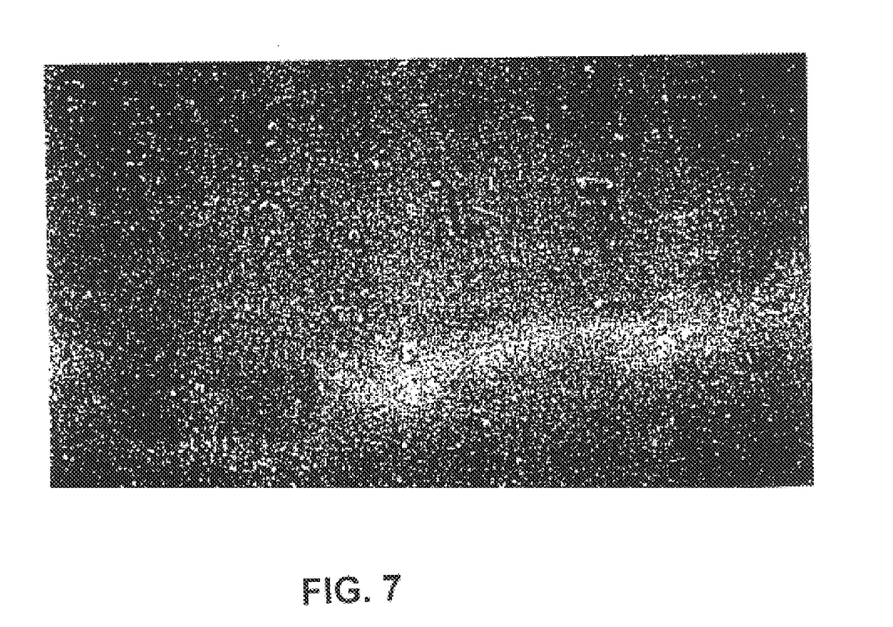
FIG. 7 is a SEM at a magnification of 5000× of a hydrothermally treated comparative silica support lacking a zeolite membrane.

FIG. 7 is a (SEM) taken at a magnification of 500× of the silica support after hydrothermal treatment. An examination of the SEM reveals the lack of any substantial zeolite growth, due to the lack of $Al_2O_3$ in the support available for zeolite growth.

Figure 8:
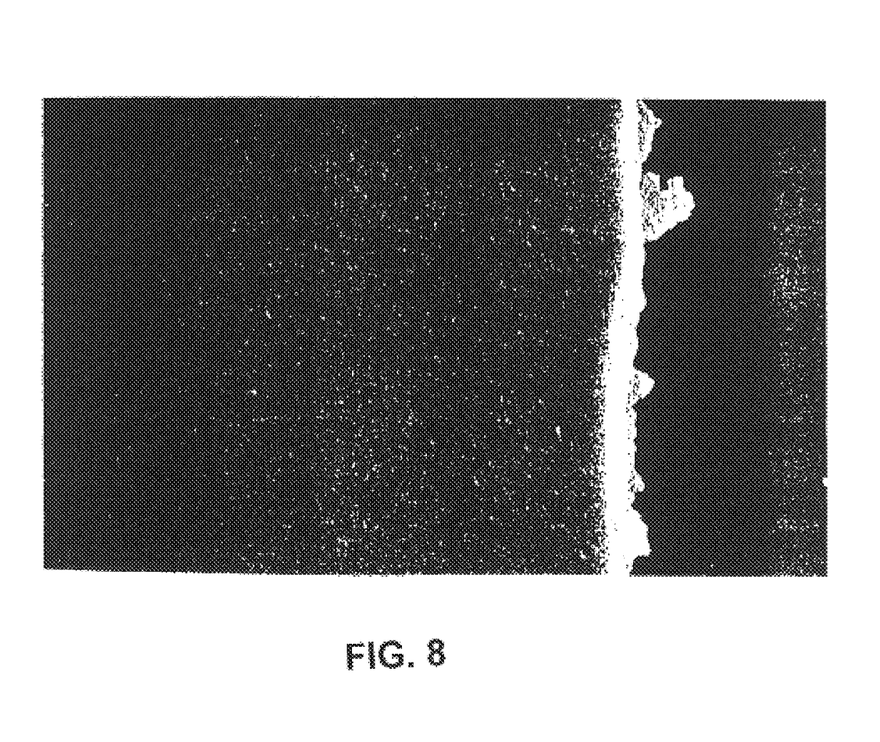
FIG. 8 is a SEM at a magnification of 5000× of a cross-section of the hydrothermally treated silica support supported of FIG. 7.

FIG. 8 is a SEM taken at a magnification of 5000× of a cross-section of the silica support of comparison example 1 after hydrothermal treatment. An examination again reveals the lack of any formation of a zeolite crystal layer.

We claim:

1. A supported synthetic zeolite membrane comprising:
a porous monolithic ceramic support having a multicellular structure comprising at least 4 through channels per square inch of frontal surface area, a porosity of between 20–60%, an average pore size of 0.1 to 10 microns, a composition comprising, on an analytical oxide basis, 10–95%, by weight alumina and 5–90% by weight $SiO_2$, and a crystal phase assemblage selected from the group consisting of cordierite, crystobalite, mullite, alumina, and/or mixtures thereof;
a uniformly thin, essentially continuous, defect free zeolite crystal layer attached to and integral with the porous ceramic support, the zeolite crystal layer: having a thickness between 1 and 50 µm; being free of zeolite crystals resulting from Stokes settling; having less than 1 volume % voids; incorporating zeolite crystals exhibiting a substantially columnar cross-section; and being free of growth enhancing, selectivity enhancing, and reparation layers.

2. A supported synthetic zeolite membrane in accordance with claim 1 wherein the zeolite crystal layer comprises a single layer of zeolite crystals and is less than about 25 µm thick.

3. A supported synthetic zeolite membrane in accordance with claim 1 wherein the ceramic support comprises at least 50% alumina, by weight and contains a primary crystalline phase of mullite.

4. A supported synthetic zeolite membrane in accordance with claim 1 wherein the zeolite crystals of the zeolite crystal layer are of a structure type selected from the group consisting of zeolite X, zeolite Y, zeolite A, mordenite, MFI, sodalite, sodium-p1, and zeolite beta.

5. A supported synthetic zeolite membrane in accordance with claim 4 wherein the zeolite crystals of the zeolite crystal layer are of the ZSM-5 structure type.

6. A supported synthetic zeolite membrane in accordance with claim 1 wherein the zeolite crystal layer contains less than 0.1 volume % of voids.

7. A method for forming an alumina silicate zeolite membrane on the surfaces of a porous monolithic ceramic support comprising the steps of:
providing a porous ceramic monolithic support having a porosity of about 20–60% and an average pore diameter of 0.1 to 10 microns, the porous ceramic comprising, on analytical oxide basis, about 10–95% alumina by weight, the alumina being partly reactive to provide alumina raw material for forming the alumina silicate zeolite membrane;
hydrothermally treating the support with an aqueous solution having an alumina concentration of less than 0.01% and comprising sodium oxide or sodium hydroxide and silica, the treating being for a time and temperature, and at a solution pH, effective to achieve partial dissolution of the alumina in the support while maintaining essentially no zeolite nucleation in the solution;
thus to form a continuous alumina-containing zeolite membrane over the porous support having a columnar crystal structure and a thickness between 1 and 50 µm, the membrane comprising less than 1 volume % voids and being free of zeolite crystals resulting from Stokes settling.

8. A method in accordance with claim 7 wherein the alumina concentration in the aqueous solution is essentially zero.

9. A method in accordance with claim 7 wherein the alumina concentration at or proximate to the surface of the support is maintained above that which is maintained in the solution concentration.

10. A method in accordance with claim 7 wherein the hydrothermal treatment includes contacting the support with an aqueous solution having a pH between about 10–11.5 for a time of between about one hour to 100 hours at a temperature between about 60 to 200° C.

11. A method in accordance with claim 7 wherein the hydrothermal treatment includes contacting the support with an aqueous solution having a pH above 13 and for a time of between about one hour to 12 days at a temperature between about 60 to 200° C.

12. A method in accordance with claim 7 wherein the hydrothermal treatment includes contacting the support with a first sodium hydroxide solution having a pH of 10.7, a temperature of 100° C. for a period of about 2 days and thereafter contacting the support with a second sodium hydroxide solution having a pH of 12 and a temperature of 160° C. for a period of about 1 day.

13. A method in accordance with claim 7 wherein the porous ceramic exhibits a primary crystal phase selected from the group consisting of cordierite, mullite, alumina and/or mixtures thereof.

14. A method in accordance with claim 7 wherein the alumina silicate zeolite crystals formed in the zeolite crystal layer are of a structure type selected from the group consisting of zeolite X, zeolite Y, zeolite A, mordenite, MFI, sodalite, sodium-p1, and zeolite beta.

15. A method in accordance with claim 7 wherein the alumina silicate zeolite crystals of the zeolite crystal layer are of the ZSM-5 structure type.

16. A method for forming an alumina silicate zeolite membrane on the surfaces of a monolithic ceramic support comprising the steps of:

providing a porous ceramic monolithic support having a porosity of about 20–60% and a average pore size of 0.1 to 10 microns, the porous ceramic comprising, on analytical oxide basis, about 10–95% alumina by weight, the alumina being partly reactive to provide alumina raw material for forming the zeolite membrane;

subjecting the support to hydrothermal treatment with aqueous sodium oxide or sodium hydroxide solutions having alumina concentrations of less than about 0.01% for a time and temperature, and at a solution pH, effective to achieve partial dissolution of the alumina in the support without zeolite nucleation in the solution, the hydrothermal treatment comprising at least an initial step of maintaining the porous ceramic support in contact with a first sodium hydroxide solution having a pH of between 10 and 11.5 at a temperature of 100° C. for a period of about 2 days;

thus to form a continuous alumina silicate zeolite membrane over the porous support having a columnar structure, a thickness between 1 and 50 $\mu$m, less than 1 volume % voids, and is free of zeolite crystals resulting from Stokes settling.

* * * * *